Sept. 16, 1969　　　J. H. ELLINGER　　　3,467,198
GEAR TRANSMISSION

Filed Nov. 29, 1967　　　　　　　　　　　　　3 Sheets-Sheet 1

Inventor
John Henry Ellinger
By Cushman, Darby & Cushman
Attorneys

Sept. 16, 1969

J. H. ELLINGER 3,467,198

GEAR TRANSMISSION

Filed Nov. 29, 1967

Inventor
John Henry Ellinger
By
Cushman, Darby & Cushman
Attorneys

United States Patent Office 3,467,198
Patented Sept. 16, 1969

3,467,198
GEAR TRANSMISSION
John Henry Ellinger, Mickleover, Derby, England, assignor to Rolls-Royce Limited, Derby, England, a British company
Filed Nov. 29, 1967, Ser. No. 686,433
Claims priority, application Great Britain, Dec. 5, 1966, 54,417/66; Oct. 27, 1967, 48,909/67
Int. Cl. B63h *3/00, 7/00*
U.S. Cl. 170—160.48   25 Claims

ABSTRACT OF THE DISCLOSURE

A gear transmission for driving variable pitch aerofoil blades to vary their pitch comprises an inner set of blades through which extend radial shafts, the radial shafts being drivingly engaged with peripheral shafts which drive the variable pitch blades through a worm and wheel mechanism whereby the unloaded transmission is freed from torsional blade oscillations transmitted from the blade roots.

---

This invention relates to a gear transmission for driving variable pitch aerofoil blades from drive means.

In many instances it is desirable to vary the pitch of aerofoil blades in such applications as the fans of gas turbine engines and the like. However, a transmission for carrying drive to such aerofoils has stringent requirements to meet. Thus it must be capable of holding the blade against centrifugal twisting moments when the fan is in rotation and it must provide for pitch variation within a time decided from other factors.

The present invention provides a gear transmission which enables the transmission to be freed from torsional oscillations due to the blade being amplified in the transmission.

According to the present invention a gear transmission for driving variable pitch aerofoil blades from drive means to vary their pitch comprises a plurality of radial shafts extending through an inner set of radially extending blades, said radial shafts being drivingly connected to one or more peripheral shafts which engage the roots of the blades whose pitch is to be varied by a worm and wheel drive, whereby the transmission may be unloaded when inoperative and amplification of torsional blade oscillations through the drive avoided.

Preferably each said variable pitch aerofoil blade is mounted on an axial bearing adapted to resist centrifugal loads on the blade when the blade is in operation, said worm and wheel drive engaging with the roots of said blades in such a manner that the centrifugal twisting moment acting on said blade in operation is diminished by the friction at said axial bearing so that said worm and wheel is subjected only to the difference between these forces.

Preferably, said axial bearing comprises a plain bearing.

Said blade root may comprise a cylindrical member secured against axial movement at its extremity distant from the blade and carrying a toothed sleeve which is attached to said cylindrical member at one extremity only, said toothed sleeve acting as the wheel of said worm and wheel.

Each said blade may be driven by two said worm and wheel drives preloaded so as to prevent backlash at the blade root, and each said worm preferably comprises a hollow double enveloping worm, the radial bearings of the worm engaging with its interior and drive being taken to the worm by way of internal splines mating with external splines on the peripheral shafts.

The invention will now be particularly described merely by way of example with reference to the accompanying drawings in which.

Figure 1:
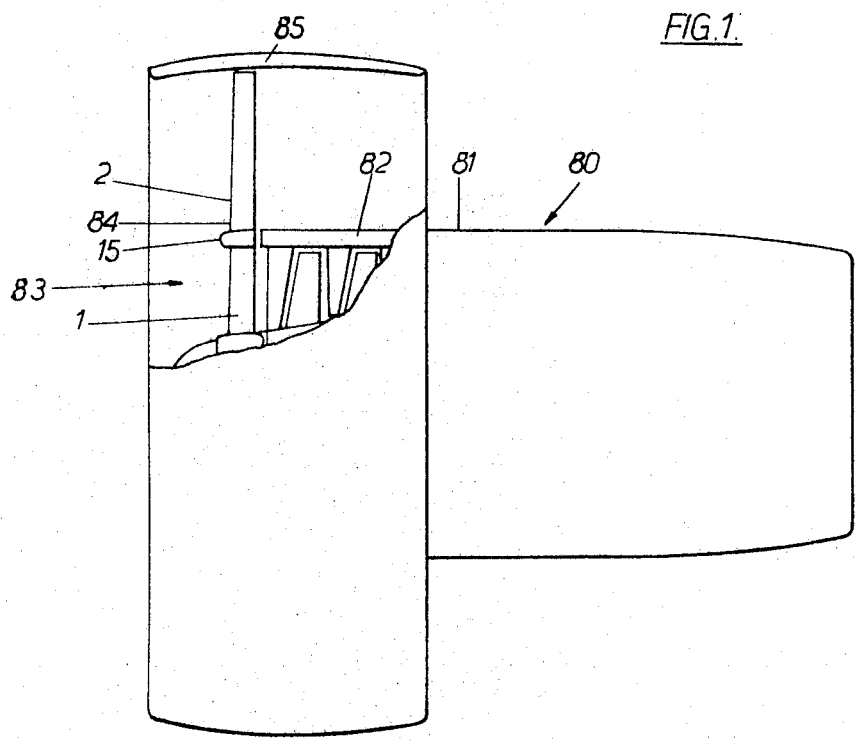
FIGURE 1 is a partly broken away sketch of a gas turbine engine including aerofoil section blades according to the invention.

In FIGURE 1 there is shown a gas turbine engine 80 having an outer casing 81 within which there are mounted a compressor 82, combustion equipment (not shown) a turbine (not shown) and a final nozzle. The compressor and turbine are drivingly interconnected and as the first stage of the compressor there is mounted a fan 83. The fan comprises a plurality of blades 84 each of which consists of a inner portion 1 and an outer portion 2. These portions are joined by a blade ring 15 which forms in effect the leading edge of the casing 81 of the main engine. The fan blades 84 are surrounded by a fan cowling 85.

Although the fan blades 84 have been referred to as being single blades, the outer portions are in fact displaced circumferentially from the inner portions so that they lie halfway between the inner portions 1.

It will be understood that should any component failure lead to the necessity to shut down an engine such as 50, or to progressively arrest it when the aircraft in which it is mounted is in flight the fan 54 will provide drag which varies with the geometry of the blade system in the bypass duct. If such an occurrence has to be allowed for it is normally necessary to uprate the engines to cover this contingency leading to increased cost and weight of the installed engine.

The two principal conditions for feathering outer fan blades are:

(a) Partial feathering to reduce drag on windmilling probably due to an obstruction in the fuel supply to the engine.

(b) Fully feathering to arrest rotor anticipating damage to the engine under certain conditions of engine failure.

Hence to reduce the windmilling drag of the fan one could feather the blades of the fan. As in these fan blades there is usually a significant twist between the root and the tip it is undesirable to feather the entire blade since the drag increase of parts of the blade which are substantially parallel to the air flow will off-set drag decrease in those parts which are at a substantial angle. Therefore in the present case only the portion 2 is feathered, the portion 1 being maintained in its original relationship.

The mechanism for feathering these outer portions should ensure that the windmilling rotor comes to rest when the blades are fully feathered, causing a significant reduction in drag. The need to split the blades must not affect the air flow into the first stage of the compressor. The blade mounting and mechanism to support the blades should, therefore, be miniaturised so that they can be located in a slim annulus rotating ahead of the compressor housing without obstructing it.

Figure 2:
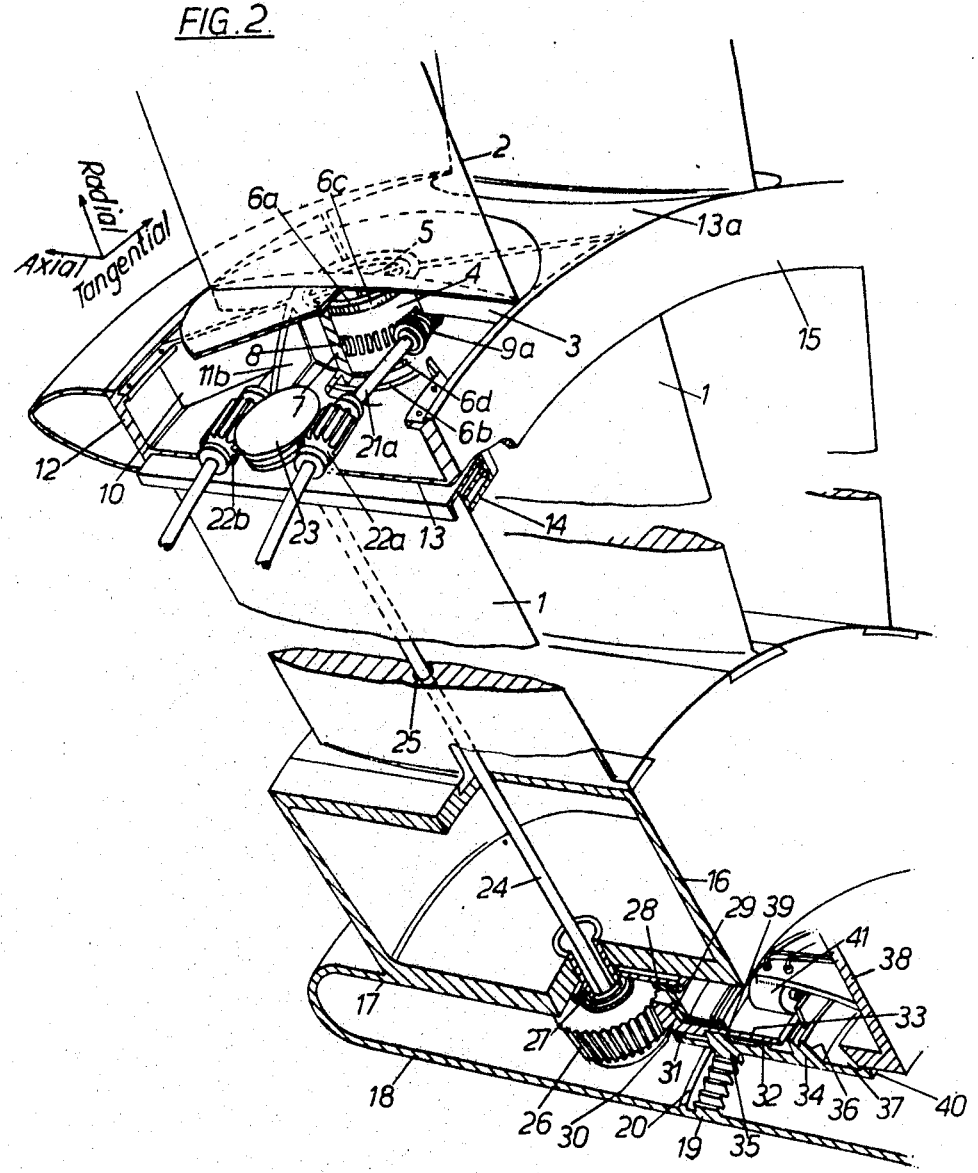
FIGURE 2 is a partly sectioned perspective view of the blades according to the invention, with a simplified geared drive for low windmilling speeds.

FIGURE 2 illustrates one simplified configuration of the feathering mechanism and drive for a fan with low windmilling speeds. The fan blade is divided into two parts by an outer blade ring 15, the inner blade portion 1 and the outer blade portion 2. As the pitch angle of portion 1 is normally small it is not desirable to feather this part of the blade. The relatively small root area at the blade mounting would in any case virtually preclude the installation of a suitable mechanism. The outer blade portion 2 is mounted at a significant pitch angle which increases with diameter and consequently only this portion is feathered.

The inner blade portions 1 are mounted on an inner blade ring 16 which is driven at 17 from a shaft 18.

The outer blade portion 2 is subject to high centrifugal loading both along and about its longitudinal axis. The blade mounting is designed to cater for these forces, and as described below the blade ring 15 takes the radial and torsional loads imposed by the outer blade portions.

Blade portion 2 may be made in hollow metal or a suitable high strength plastic. In the latter case the plastic is partly embedded in a metallic mounting 3 which is part of the metallic journal 4 ribbed internally at 5 to minimise weight. Two axial bearings 6a, 6b and end nuts (not shown) and two radial bearings 6c and 6d transfer the forces and moments acting on the blades to the outer blade ring on corresponding surfaces at 7. The blade journal is also provided with a toothed sleeve 8 (further described below) which acts as a wheel mating with two worm gears (only one shown) 9a, 9b at a high reduction ratio.

The radial force acting on the bearings 6a and 6b is transferred in shear through four webs 10 to the end rims 12 of the outer blade ring 15. These rims are designed to take most of the centrifugal forces acting on the blades, the blade mounting and the blade drive. The rims should be of minimum radial width to reduce aerodynamic drag. Their radial location coincides with the casing 81 which supports the static blades of the second and subsequent compressor stages.

The angle between the webs 10 equals the angle through which the blade portions 2 will rotate and the webs will provide suitable stops to limit the angle of rotation when high centrifugal twisting moments act on the blade portions under normal flight conditions.

The webs 10 also incorporate bearings for the worm gears 9a and 9b which are subject to high axial forces as well as normal gear separating forces.

The tangential torque transmitted through the blade portion is resisted by four webs 11a, 11b, 11c, 11d (only one shown) interposed between surfaces 7 and two internal peripheral webs (not shown) reinforcing the bore of the outer blade ring. These peripheral webs transfer moments due to tangential torque on blade portions to a position midway between blade portions, at the point where the tips of the internal blade portions are fixed. As the moments cause equal and opposite radial forces at these points, only strength in shear must be provided and this is offered by the mid section of axial surface 13 (equal to the bearing width).

Axial loading on the outer blade portions due to the propulsive force provides a moment tending to twist the outer ring. This force is almost completely eliminated by a small forward inclination of the bearing 7, using the radial centrifugal force to provide a correcting moment. Thus torsion on the outer blade ring is small. Torsion is resisted by boxing in the outer ring by cover plates 13a, 13b. The H section of the outer blade ring ensures that either the inner or the outer part of the blade ring offers some torsional resistance and thus minimises torsionally induced stresses in the end rims 12 of the blade ring. Thus the outer section of the blade ring provides the outer blade portion mounting and encloses the blade feathering mechanism.

The inner part of the outer blade ring secures the inner blade portions at their tips to the outer blade ring and covers the outer blade portion end nuts mentioned above.

The outer blade ring is highly stressed to lighten it as much as possible. Consequently it will suffer considerable radial deformation at full speed. The deformation of the inner blade ring 16 at the point of attachment 17 to the drive 18 should be small and equivalent to about one-third of the stress in the outer blade ring. This will be very difficult to ensure if the inner blade portions 1 are rigidly attached to the outer blade ring 15. The method of feathering the outer blade portions also demands that the inner blade portions should be displaced by half a blade pitch relative to the outer blade portions. A rigid connection between the inner blade portions and the outer blade ring would cause the outer blade ring to become distorted (wave shaped) along the perimeter, causing high stresses both in the outer blade ring and along the inner blade portions. This would greatly impede the design of the outer blade ring and stress the inner blade portions excessively as they are subject to a high tangential bending moment as well as centrifugal loading due to their own weight. A simple device which relies on sliding contact between the inner blade portion tips and the outer blade ring would be subject to severe fretting.

The elastic element designed to minimise radial loading on the outer blade ring and the inner blade portions respectively should primarily have only one degree of freedom thus providing a rigid tangential drive between the inner blade portions and the outer blade ring. Sufficient torsional stiffness will limit undue fore and aft oscillation of the outer blades whilst restraining all axial movement. The boxed-in spring flexure 14 satisfies this requirement especially as it will be torsionally weaker than the outer blade ring 15 and thus reduce torsionally induced stresses in the ring.

It will be seen that the tip of the inner blade portion 1 forms one side of an axially extending box section, the opposite side of which is rigidly attached to the ring 15. The two remaining sides are slightly flexible and allow controlled relative movement between the blade portions 1 and ring 15 in substantially only the radial direction. Thus since the two flexible sides cannot lengthen or shorten any relative movement must be in the direction of the other two sides, that is the radial direction.

It will be understood that although a single spring extending circumferentially and rigidly attached to both the inner blade portion tips and the outer blade ring would give the ring controlled freedom of radial motion, this arrangement would cause undesirable bending leads on the inner blade portion tips. With the illustrated arrangement the inner blade portion tips move preferentially in a radial direction with respect to the outer blade ring.

The inner blades 1 and the inner blade ring 16 are preferably made in metal to ease manufacture and assembly although a plastic construction could eventually be used to lighten the structure. By fitting the outer blade portions 2 into the outer blade ring prior to fitting the inner blade portions to the outer blade ring, assembly of the inner blade ring 16 is facilitated; the inner blades are finally held in a dovetail and if necessary shrunk into position.

The inner blade ring 16 is designed to minimise the radial movement of spring flexures 14 to minimise their length on one hand and to minimise axial stress at the interface 17 where drive 18 is attached to inner blade ring 16.

The radial surfaces of ring 16 are therefore tapered to offer an approximate root stress of ⅓ that in the outer blade ring and a circumeferential stress ⅔ that in the outer blade ring. The inner blade ring is thus subject to critical stressing.

Drive 18 is stressed to take driving torque, aerodynamic loading, gyroscopic forces and radial expansion which can cause significant deformation. The peripheral spline 19 and bearing surface 20 are therefore not critically dimensioned. A simplified description of the drive precedes a more detailed analysis.

The outer blade portion 2 is rotated via toothed wheel 8, worn gears 9a and 9b and shafts 21a and 21b (only one shown) which are connected to the wheels 22a and 22b. Both wheels are rotated in opposite sense by a central worm 23 whose drive rotates two blade portions on each side of the worn. Thus 24 outer blade portions would require 6 worm gears 23. The reduction ratio between worms 9 and wheel 8 is a compromise between the following extremes: It should be sufficiently low to ensure reasonably fast blade featuring whilst adequately reducing the torque due to the bearing friction end centrifugal twisting moment on windmilling to a low level when a self locking device is provided and the weight of flexible couplings and the shafts 21 in the high gravity field becomes acceptable. This will ensure that a relatively low torque is transmitted through the small flexible couplings (described below) between adjacent blades linked by a common shaft and to make the system less sensitive to inevitable machining errors.

The reduction ratio between wheels 22a and worms 23 is again a compromise between a minimum reduction for fast feathering and torque which permits a drive shaft 24 of adequate elasticity to be guided through the inner blades which deflect significantly under torque at full speed.

Intermediate bearings may support the drive which terminates in pinion 26. The pinion is mounted in an internal bearing 27 which is adjustably connected at 28 with bearing 29 of bevel wheel 30 through a sleeve, which is independently mounted from the inner blade ring 16 and thus not susceptible to the high centrifugal loads acting on it.

It will be appreciated that this construction enables the pinions 26 to mate with the bevel wheel 30 without being affected substantially by deformation of the inner blade ring 16. The pinions 26 are thus enabled to axially support the shafts 24.

The simplified gear box is described after a more detailed description of the transmission.

Figure 3:
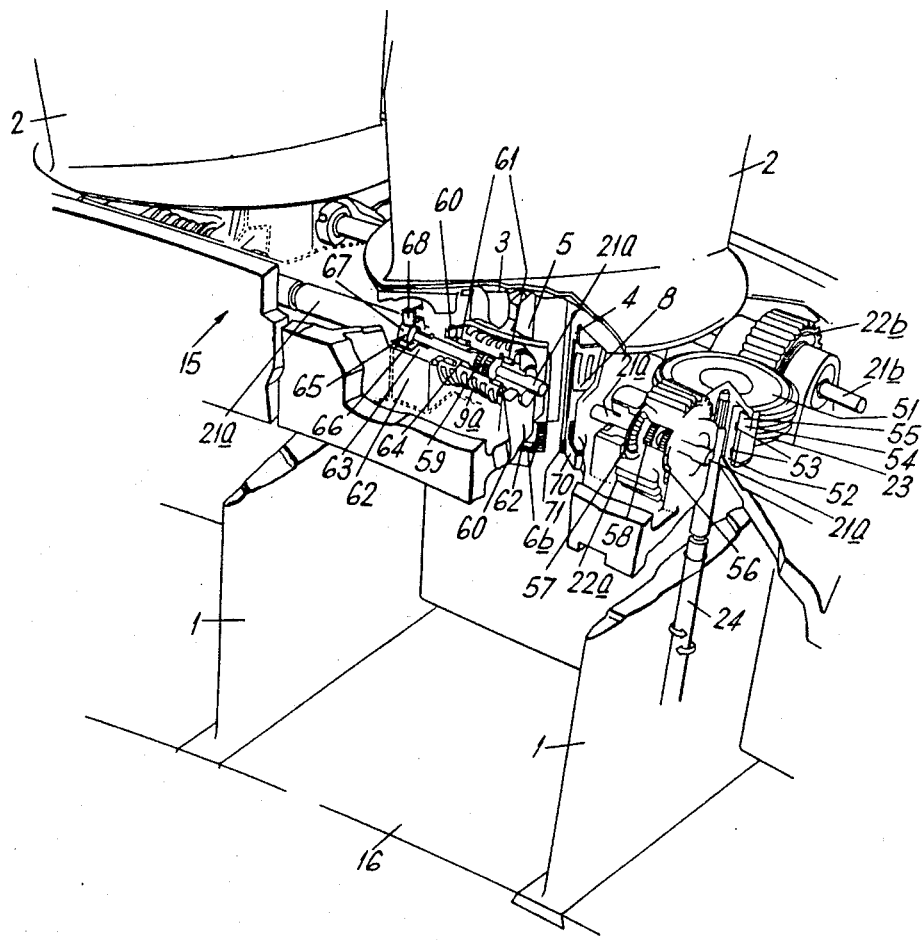
FIGURE 3 is a partly broken away perspective view of the gear transmission which carries drive to the blades according to the invention.

FIGURE 3 shows in further detail the drive between one of the shafts 24 and the outer blade portions 2. Since the design of the transmission is controlled mainly by the output, the description will commence with the blade roots and terminate at the bevel pinions 26.

The internally ribbed journal 4 forming the titanium root of the titanium or fibre reinforced plastic outer blade portion 2 is secured axially to the blade ring 15 by a bearing 6b and radially by a bearing 6a. The journal 4 is preloaded against the thrust bearing 6b by an external thread which meshes with an inner thread on a geared sleeve 8, which carries a flange 70 from which is mounted the bearing 6b. Two vernier spaced rings of threaded holes lock the journal 4 to the sleeve 8 by locking screws, one of which is shown at 71.

It will be appreciated that the journal 4 is under both tensile and torsional centrifugal loads while the fan is in operation, and that by mounting the sleeve 8 from the journal 4 at one extremity only, the sleeve 8 is enabled to be substantially free of any torsional loads when the fan is in operation and the drive is dormant. Again when the fan is operating the centrifugal load on the bearing 6b will cause a frictional force which resists the centrifugal twist acting on the blade. Hence only the difference between this frictional force and the centrifugal twisting will be transmitted through to the sleeve 8, and by making the bearing 6b a plain bearing and of relatively small size this frictional resistance can be increased while the weight and volume of the bearing is decreased.

It will be noted that not only is the toothed sleeve divorsed from any centrifugal loads sustained by the portion 4, but also the journal 4 may now be made without being weakened by teeth cut in its outer periphery. Again the sleeve 8 can be made of a material more suitable for gears such as steel while the journal 4 may be of titanium so as to reduce weight.

The blade root may be rotated to vary the pitch of the fan by diametrically opposed pre-loaded worms 9a and 9b (only 9a is shown).

The construction of the worms 9 is particularly important since the worms must be of the maximum diameter possible so that they can transmit as large a torque as possible, whilst simultaneously they must be light and easily assembled into the ring 50 without radial bolts or the like which might tend to shear under the very high centrifugal loads developed in the fan. While the present construction is suitable for a feathering device operating only while the fan is inoperative or slowed down, if the pitch variation were intended to produce reverse thrust it would be necessary to strengthen this item.

Each worm 9 is designed to be a double enveloping worm so that it can transmit more torque than the more common straight worm. The worms 9 are splined internally to engage with a splined connection 59 from peripheral shafts 21. The reduction ratio at the worm 9 and sleeve 8 is carefully chosen so that the peripheral shafts 21 and couplings 65 may be as light as possible whilst offering an acceptable speed of feathering. The worms are hardened and ground on their internal and end faces so as to engage with radial bearings 61 and thrust bearings 60 which are mounted from a common cage 63. The common cage is inserted and screwed through an aperture in supporting structure 61 mounted from the ring 15.

The cage 63 is also arranged to carry the bearing 64 for the shaft 21 which extends from the worm 9 to the next adjacent worm. A similar structure is used on both ends of the worm thus making assembly of the worm particularly easy.

It will be explained later that the use of the splined connections 59 inside the worm avoids the use of a pair of bulky external couplings and also enables the supporting structure for the worms to be used as a support for a bearing for the shaft 21. Again the use of internal bearings 61 enables the bearings to be assembled to the ring without the use of nuts or bolts. The method of assembling adopted is to position the worm 9 and the bearings 60 and 61 in place, then to introduce cages 63 and screw the cage into the structure 62. Shims may be used to accurately locate the worms axially.

The use of the internal bearings 61 leads to important mechanical advantages in that the bearings are closer to the engagement between the worm and sleeve 8 than they could be if they were external. Hence the moments acting on the bearing are reduced, and smaller bearings may be used. The worms 9 are driven from shafts 21, and it will be noted that the shaft 21 in one case extends between two adjacent blade portions 2.

The torque to be transmitted through a single worm, which is also transmitted through the couplings 65, is doubled when the shafts 21 pass through the next adjacent worm. Therefore, the torque to be carried by the part of the shaft 21 which extends from the second worm is doubled, and therefore any flexible couplings used in these parts of the shaft would have to be of extremely large weight. To avoid the use of a full length shaft and the consequent flexible couplings, the drive to the circumferential shafts 21 is introduced midway between two blades and drives four blades only, so that the shafts 21 have to bear the torque for two worms 9 but are only of half the length of the full shafts extending between the two extreme blade portions. Therefore, any small inacouracies and deflections can be taken by connections such as 59 without the necessity to resort to flexible couplings.

Owing to its length, shaft 21 is prone to some deflection and it is necessary to provide a central journal bearing (not shown) and additionally a flexible coupling between the worm and the shaft, and this coupling is shown at 65. The flexible coupling 65 is positioned adjacent the structure 62 and comprises an outer sleevelike portion 66 and a central spider portion 67. The sleeve portion 66 is mounted in a bearing in the supporting structure 62 against centrifugal loads and is soft soldered to a stub shaft integral with worm 9 while the spider portion 67 is drivingly connected to the long extent of the shaft 21 which extends to the next worm 9. The connection between the spider portion 67 and the sleeve portion 66 takes the form of four pins which extend from the spider portion and each of which engages in a hole in the sleeve 66.

It will be appreciated that the four pins, which are a fairly loose fit in the holes in the sleeve portion 66, enable some relative motion of the two shaft parts to take place so that any small inacouracies or deflections may be accommodated.

Holes are provided in the end face of the sleeve 66 to enable a spannering device to be inserted through into similar holes in the cage 63.

The drive to the peripheral shafts 21 is transmitted from a pair of wheels 22a and 22b having their axes substantially peripheral to the ring 15. The drive is actually transmitted by a splined connection 58 which is soldered on to the shaft 21, enabling assembly of the drive, and which engages with the splined interior of the wheel 22.

Preferably the connection 58 is soldered to the shaft 21 so that the joint can be made a shear link which will shear at a predetermined value so as to protect the rest of the transmission from accidental damage. The joint between the shaft 21a and the couplings 65 may also be made a soldered joint having a predetermined shear strength so that each part of the transmission is isolated from each other part by such a shear link.

The wheel 22 is mounted in taper bearings 57 from structure which is carried from the ring 15. Thus the splined connections 58 enable the wheels 22 to be mounted substantially independent of the shaft 21 so that they are not affected by expansions or contractions of the ring 15. The wheels 22 engage in pairs with a worm 23. The worm 23 is mounted on a journal 52 from the ring 15 by way of radial bearings 53 and an axial bearing 54, the wheel 23 being secured to and preloaded on the journal 52 by an end nut 55. The drive to the worm 23 is taken by way of a splined connection between the shaft 24 and a diaphragm 51. It will be appreciated that the splined connection between the shaft 24 and the diaphragm 51 enables the worm 23 to be isolated from radial differential motion between the shaft 24 and the ring 15, while the diaphragm 51 is made sufficiently flexible in bending to enable it to deflect to minimise distortion in the engagement between the worm 23 and wheels 22 due to deflection of the shaft 24 when the fan is under load. Since the feathering mechanism of the present embodiment will only operate when the fan is slowed or stopped, it is only necessary to cater for drive when the deflections of the shafts 24 are small.

The engagement between the worm 23 and the wheel 22 is substantially isolated from distortions affecting the shaft 24 and the shaft 21 by the present construction.

The shaft 24 extends from the worm 23 to a bevel pinion 26. In order to provide the necessary speed of feathering and reduce the torque on shafts 21 it is necessary that the worm 23 and wheels 22 have such a ratio that the shaft 24 is caused to experience fairly high torque. It is under considerable centrifugal load, which depends largely on its mass. To minimise this load the end portion of the shaft is counterbored, thus reducing the weight while not significantly affecting the torque capacity of the shaft.

The shafts 24 are secured at their inner extremities to the pinions 26, and as described above they are axially free at their outer extremities, hence they are under tension over their entire length due to centrifugal loads when the fan is running. This will also effect stiffening of the shafts to resist deflection better when the inner blade portions 1 are transmitting torque to the blade ring 15.

Again, if pitch variation of the blade portions 2 is proposed to provide reverse thrust, the shafts 24 will require strengthening to take centrifugal and drive loads simultaneously.

A simplified form of geared drive will now be outlined which is suitable for fans with low windmilling speeds owing to the high speed increase caused between bevel wheel 30 and pinions 26.

For higher windmilling speeds a gear box as described in our copending application number 29,245/67 will be preferred.

The bevel wheel carries two internal bearing surfaces 31 and 32 and a long spline 33. This spline is engaged by slide 34 whose short internal spline 35 engages with splines 19 on the drive 18 or alternatively the slide engages conical surface 36 on the mating surface 37 of the static housing 38. In each case, the spline 39 on the periphery of slide 34 will engage the internal splines 33 of bevel wheel 30. The slide is centred on bearing 40 which is in continuous operation whilst the fan blades rotate. Slide 34 is moved axially by a series of hydraulic cylinders 41 fitted to the static mounting 38. Thus flexible pipe connections are avoided. It will be possible to use an electric actuator in place of the cylinder 41.

During normal flight of an aircraft powered by the engine 49, slide 34 drives bevel wheel 30 at the same speed as drive 18 by engagement between splines 19, 35, 39 and 33. Thus there is no relative movement of pinion 26 about its own axis and the entire mechanism except bearing 40 and worm gear 9 is at rest and unloaded. Thus wear and failure for extraneous reasons is most unlikely.

When the engine windmills and the rotor is to be arrested, hydraulic cylinders 41 are activated and the slide 34 is moved axially to engage on conical surfaces 36 and 37 respectively. As the slide is thus arrested bevel wheel 30 is arrested and pinion 26 will now rotate about its own axis actuating the drive and feathering the outer blades. The rotor will therefore be subject to progressively less aerodynamic force tending to windmill the fan. When the blades have turned to a position where the air load is equal on both sides of the blade the rotor comes to rest. If, due to inertia the blades are turned beyond the equilibrium position then the rotor will reverse its direction of rotation due to air loading on the reverse surfaces of the blades. Some slip is then anticipated between conical surfaces 36 and 37. Thus the gear train has its own "feed back" system and requires no attention by the operator or complex monitoring equipment. This drive will be seen to be a relatively light epicyclic system which has low mechanical efficiency. This will make it relatively insensitive to hunting, whilst avoiding high machining tolerances.

In the simplified design no attempt is made to reverse the blades in flight. In a more advanced design a reversing device may be incorporated. This would be useful where the flight plan of the aircraft demanded an engine capable of efficient operation at differing thrust levels, or to provide reverse thrust for landing or braking. Again it may be possible to effect some noise reduction by utilising controlled variable pitch on the fan blades.

It will be appreciated that if a modified slide 34 is rotated fractionally either faster or slower than drive 18 the drive will be able to feather in either direction in flight. This can be achieved by hydraulic, electric or mechanical means used to drive a member which can be engaged with the wheel 30.

Again, it could be possible to use a motor driving directly on to the shaft 24, although this would entail further complication.

In the present embodiment when the blades are restored to their original setting after engine maintenance the rotor is turned in the reverse direction by an external drive whilst the conical surfaces 36 and 37 are lightly engaged so that there will be some slip on the interface when the blades have reached the fully feathered position.

I claim:

1. A gear transmission for driving variable pitch aerofoil blades from drive means to vary their pitch, in which there is an inner set of blades, radial shafts drivingly connected to said drive means and each extending through one of said inner blades, at least one peripheral shaft drivingly connected to each said radial shaft, and a worm and wheel drive drivingly connecting said peripheral shafts to said variable pitch blades to vary the pitch of said blades, whereby said transmission is unloaded when inoperative and magnification of torsional blade oscillations through the drive is avoided.

2. A gear transmission as claimed in claim 1 and in which each said variable pitch aerofoil blade is mounted on an axial bearing adapted to resist centrifugal load on the blade when the blade is in operation, said worm and wheel drive engaging with the roots of said blades in such a manner that the centrifugal twisting moment acting on said blade in operation is diminished by the friction at said axial bearing so that said worm and wheel is subjected only to the difference between these forces.

3. A gear transmission as claimed in claim 2 and in which said axial bearing comprises a plain bearing of low weight and high friction whereby said frictional force may be enhanced.

4. A gear transmission as claimed in claim 3 and in which there is a drive connection between said blade and the engagement of said worm and wheel drive, said axial bearing being disposed in said drive connection.

5. A gear transmission as claimed in claim 4 and in which each said blade root comprises a cylindrical member secured against axial movement at its extremity distant from the blade and carrying a toothed sleeve which is attached to said cylindrical member at one extremity only, said toothed sleeve acting as the wheel of said worm and wheel so that said sleeve carries only torque loads, said cylindrical member transmitting all centrifugal loads on the blade.

6. A gear transmission as claimed in claim 1 and in which each said blade is driven by two said worm and wheel drives, there being a vernier locking device whereby said worm and wheel drives may be preloaded to prevent backlash.

7. A gear transmission as claimed in claim 6 and in which the wheel of each said worm and wheel drive is formed on the root of each said blade portion and has two worms engaging therewith at diametrically opposed locations.

8. A gear transmission as claimed in claim 7 and in which each said worm comprises a double enveloping worm.

9. A gear transmission as claimed in claim 1 and in which each said peripheral shaft carries external splines and each said worm is hollow and formed with internal splines which engage with said external splines for the transmission of drive.

10. A gear transmission as claimed in claim 9 and in which are there bearings on which each said worm is mounted, said bearings engaging with the interior of the hollow worm.

11. A gear transmission as claimed in claim 10 and in which are are bearings adapted to take radial loads and which engage with the interior of the hollow worms and bearings adapted to take axial loads which engage with end faces of the worms.

12. A gear transmission as claimed in claim 11 and in which there are two common support members for each said worm, each of which carries one of said radial bearings, supporting structure being provided and having apertures through which said support members may be introduced and adjusted to engage with the interior of the hollow worm via said radial bearing.

13. A gear transmission as claimed in claim 1 and comprising a flexible joint interposed in at least one of said peripheral shafts.

14. A gear transmission as claimed in claim 13 and in which each said flexible joint comprises an outer race mounted from one portion of said peripheral shaft and an inner race positioned inside said outer race and mounted from another portion of said peripheral shaft, there being pins extending from said inner race and holes in said outer race in which said pins engage to transmit drive between the inner and outer races.

15. A gear transmission as claimed in claim 14 and in which each said outer race is held against centrifugal loads by a bearing mounted in the structure which supports the bearings for said worms.

16. A gear transmission as claimed in claim 14 in which a shear link is provided in at least one said peripheral shaft which is adapted to shear should an excessive torque be applied to the peripheral shafts.

17. A gear transmission as claimed in claim 16 and in which said shear link comprises a soldered joint between said peripheral shaft and said flexible joint.

18. A gear transmission as claimed in claim 1 and in which there is a central drive mechanism from which said radial shafts drive.

19. A gear transmission as claimed in claim 18 and in which there are further worms driven from said radial shaft and further wheels which drive said peripheral shafts, said further worms and wheels engaging to provide drive connection between said radial and peripheral shafts.

20. A gear transmission as claimed in claim 19 and in which are is a blade ring from which said further worms and wheels are mounted, and connections between said radial and peripheral shafts and said further worms and wheels respectively whereby expansions and contractions of said ring may take place without preloading or distorting the drive from the further worm and wheel.

21. A gear transmission as claimed in claim 20 and in which there is a flexible diaphragm which carries drive between each said radial shaft and each said further worm, said diaphragm having sufficient flexibility to accommodate deflection of the radial shaft when the variable pitch blades are under load and to transmit torque whilst the blades are off loaded thus preventing distorted engagement of the worm and wheel.

22. A gear transmission as claimed in claim 18 and in which said radial shafts are counterbored over at least part of their length so as to reduce centrifugal loads acting on them.

23. A gear transmission as claimed in claim 22 and in which there are a plurality of bevel pinions from each of which one said radial shaft is located at its inner extremity.

24. A gear transmission as claimed in claim 23 and in which there is a central tube from which said bevel pinions are mounted, and a shaft carrying a gear which mates with said bevel pinions, said tube and shaft being coaxial.

25. A gear transmission as claimed in claim 1 in which each said radial shaft drives peripheral shafts which in turn drive four said variable pitch aerofoil blades.

References Cited

UNITED STATES PATENTS 2,670,050   2/1954   Enos.
3,153,907   10/1964  Griffith.

FOREIGN PATENTS 905,229   4/1945   France.
332,943   2/1921   Germany.
378,149   1/1940   Italy.

EVERETTE A. POWELL, JR., Primary Examiner

U.S. Cl. X.R.

170—166, 167; 230—122